Aug. 24, 1965  A. KRINSKY  3,202,951
ALLOYS AND ELECTRICAL TRANSDUCERS
Filed Aug. 16, 1961

To Vac Pump

INVENTOR:
Albert Krinsky
BY

Attorney

United States Patent Office 3,202,951
Patented Aug. 24, 1965

3,202,951
ALLOYS AND ELECTRICAL TRANSDUCERS
Albert Krinsky, Bethesda, Md., assignor to the United States of America as represented by the United States Atomic Energy Commission
Filed Aug. 16, 1961, Ser. No. 131,944
8 Claims. (Cl. 338—2)

The present invention relates to new alloys, to electrical resistance elements utilizing such alloys which are particularly adapted for use at elevated temperatures, and to new and improved electrical transducrs, including strain gauges and resistors, employing such elements.

A desirable characteristic of alloys to be used in high temperature applications is the ability to resist oxidation for prolonged periods. This property is of particular importance in alloys which are used in the resistance element of electrical transducers, such as strain gauges.

Electrical strain gauges have come to be widely used for ascertaining stresses and strains to which articles are subjected. In the past, they were usually constructed with the resistance element in the form of a fine wire disposed in back and forth manner in spaced apart parallel lines, the parallel lines being bonded throughout their lengths to an insulating base by some suitable adhesive. More recently, strain gauges have been constructed with the resistance element formed by bonding a thin metal foil to an insulating backing, the resulting gauge being attached to the article to be tested by a suitable adhesive.

The nature of the backings and adhesives have limited previous strain gauges to usage at relatively low temperatures. It has been attempted to use such gauges at higher temperatures by discarding the referred to backings and attaching the wire or foil directly to the article to be tested by insulating adhesives. This latter procedure presents disadvantages in that the fine wires and foils are difficult to handle, particularly when used without an insulating backing or a supporting base in the higher temperature applications. A further disadvantage or drawback is the necessity of using a non-conducting adhesive which will not chemically attack or objectionably affect the fine wires or foils. A further objection to previous strain gauges is that they have been limited to such metals and alloys as could be drawn or rolled to small diameters or thicknesses.

The present invention is directed to an alloy having greatly improved high temperature oxidation resistance which may be used in electrical resistance elements exposed to oxidizing conditions at elevated temperatures and is particularly directed to providing a resistance element to overcome the above and other difficulties and disadvantages found in present strain gauges, and a method of making strain gauges utilizing the resistance element which is not limited to drawn or rolled wires or foils and which may be readily and satisfactorily employed in high temperature applications.

For the purpose of clarification of the present invention, the term resistance element is used to describe a resistance film and its associated backing, together with the appropriate electrical leads attached thereto. Thus, the resistance film described herein, to be used in a resistance element, requires some additional supporting member in addition to the electrical leads.

An object to the present invention is to provide novel iron-aluminum-titanium oxidation resistant alloys, suitable for use in electrical resistance elements.

Another object of the invention is to provide new and improved electrical resistance elements.

Another object of the invention is to provide electrical transducers which are particularly adaptable to use in high temperature applications.

Another object of the invention is to provide a strain gauge which is particularly adaptable to use in high temperature applications.

A further object of the invention is to provide a new and improved method of manufacturing said strain gauge.

A further object of the invention is to provide a strain gauge which does not require employment of any wires in its strain measurement portion, either in the gauge itself or incident to its manufacture.

A still further object of the invention is to provide an improved strain gauge which may be attached to articles with either electrically insulating or electrically conducting adhesives, and yet perform in highly satisfactory manner.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, I have found a novel alloy of the composition range of from 25–30 atomic percent iron, 35–50 atomic percent aluminum, and 20–40 atomic percent titanium. Alloys in this composition range resist oxidation at high temperatures, are not attacked by such corrosive agents as concentrated hydrochloric acid or water, and do not tarnish. These properties make the alloy particularly desirable as a protective coating in corrosive applications. Alloys in the above composition range are also useful in the form of a thin film in the resistance element of electrical transducers, such as the strain gauge hereinafter described.

A preferred embodiment of a strain gauge employing the alloy of the present invention in the form of a thin film in the resistance element—also described as a strain sensitive film—has been chosen for purposes of illustration and description. The preferred embodiment is not intended to be exhaustive nor to limit the invention to the precise form disclosed. It is chosen and described in order to best explain the principles of the invention and their application in practical use to thereby enable others skilled in the art to best utilize the invention in various embodiments and modfications as are best adapted to the particular use contemplated.

In the accompanying drawings, which are more or less diagrammatic:

Figure 1:
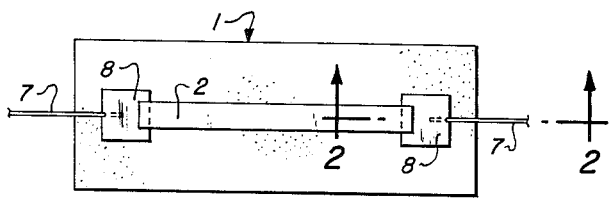
FIG. 1 is a plan view of a preferred embodiment of the invention.
Figure 2:
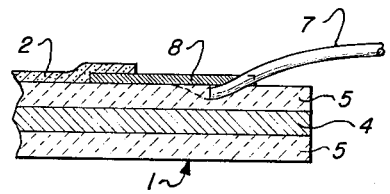
FIG. 2 is an enlarged cross sectional view taken along line 2—2 of FIG. 1.

Referring more particularly to FIGS. 1 and 2, there is shown a substrate 1 carrying a strain sensitive film 2 electrically connected with anchored wire leads 7 by intermediate electrically conducting film contacts 8. The substrate comprises a thin metal foil 4 having at each flat face thereof a ceramic layer 5. The intermediate foil 4 may be of a high temperature corrosion resistant metal about .001 inch in thickness.

Suitable corrosion resistant metals include alloys of iron, nickel, or chromium base types; for example, the nickel-base alloy Inconel having the following composition has given good results.

| | Percent |
|---|---|
| Nickel | 77.40 |
| Chromium | 15.00 |
| Iron | 7.00 |
| Manganese | .35 |
| Silicon | .20 |
| Carbon | .05 |

The ceramic layer may be of any suitable high temperature ceramic; the generally known National Bureau of Standards composition, NBS Ceramic Coating A–418, has given good results. (Composition described in Cuthill, Richmond, and Tighe, "Effect of a Ceramic Coating on the Creep Behavior of Some High Temperature Alloys," American Ceramic Society Bulletin, 38 (1959), pp. 4–12, Tables 2 and 3). The thickness of each of the ceramic layers 5 carried by the foil layer may be about .001 inch, making a total thickness of the substrate of about .003 inch. The resulting substrate 1 is thin, flexible, non-conducting and has smooth non-porous surfaces; the substrate may readily be bent around a very small radius or cut with shears without danger of cracking or chipping the ceramic layers 5. The method of making the substrate will be fully described hereinafter.

The leads 7 are embedded in the ceramic layer 5 at one side of the foil layer 4 and are thus firmly anchored in position. Various metals may be used for the lead wires, e.g., platinum, platinum-10% rhodium alloy, or a nickel-chromium alloy such as 80% nickel-20% chromium. While wire of any suitable diameter may be employed, a wire diameter of about .005 inch has given good results.

The electrically conducting film contacts 8 may comprise gold or platinum areas which overlap and electrically connect with the embedded lead wires 7. A gold film is preferred due to the much lower resistivity of the deposited film.

The strain sensitive film 2 carried by the ceramic layer 5 extends between and overlaps the electrically conducting film contacts 8 and may be formed by evaporative deposition of an alloy of iron, aluminum and titanium on the substrate 1, as will be hereinafter more fully described. While the thin strain sensitive film 2 is shown of generally rectangular outline or shape, this is purely for purposes of illustration as it may be of any other shape, e.g., spiral, arcuate, etc., appropriate to its employment. The resistance of the film 2 may be controlled by varying either the thickness of the film or its area, or both. Electrical strain sensitivity over wide limits may be obtained or controlled by suitably varying the thickness of the film. The temperature coefficient of resistance may be either negative, or positive, or zero, depending on the particular film thickness selected.

The strain sensitive film 2 is carried by a non-conducting ceramic layer 5, and hence when the device is secured to an article or test structure it is electrically insulated therefrom so that the adhesive or cement used to secure the device in position need not be of the electrically insulating type. When the device is to be used under conditions of temperature below 200° C. epoxy type adhesives may be used and for higher temperature uses ceramic type adhesives may be employed.

The substrate 1 may be manufactured by suitably cleaning and degreasing a length of Inconel foil and then dipping it into a slurry of the NBS A–418 ceramic, allowing the deposited slurry to air dry and then firing the coated foil in a kiln that is maintained at a temperature of about 1900° F., for about 10 minutes. The resulting composite substrate 1 is thin, flexible, and non-conducting with a smooth nonporous surface. The thickness of the ceramic coating 5 on the intermediate foil 4 may be controlled by adjusting the consistency of the slurry. As previously indicated, a total thickness of the substrate 1 of about .003 inch has been found to be satisfactory for use under many conditions and with many test articles. While the ceramic could be applied by painting or otherwise, the described dipping step has been found to give an optimum coating.

After preparation of the substrate 1 as above, the leads 7 may be attached by embedding them in the ceramic coating. This may be achieved by placing an end portion of a lead wire 7 against the ceramic surface and heating the adjacent contact area with an oxygen torch until the ceramic melts and engulfs the end portion of the wire. When properly executed, the lead wires are firmly embedded in, or bonded to, the substrate but are electrically insulated from the intermediate foil layer 4 of the substrate as they are not so deeply embedded as to contact the layer. This described procedure is preferred to endeavoring to attach the leads prior to drying and firing of the ceramic slurry.

The next step in manufacture of the substrate 1 is to apply the film contacts 8. This may be done by painting the area with a suitable resinous suspension of a heat decomposable compound of an electrically conducting, oxidation resistant metal such as gold or platinum. There are available such suspensions of compounds as Liquid Bright Gold for Ceramics or Liquid Bright Platinum No. 05 made by Hanovia Chemical and Manufacturing Co., Newark, New Jersey, or Liquid Bright Gold #4942 or Liquid Bright Platinum #6558 made by E. I. du Pont de Nemours & Co. Inc., Electrochemicals Dept., Wilmington, Delaware. These resins, in addition to binders, contain a solution of a compound of the metal; they are applied so as to overlap and make electrical contact with the embedded lead wires 7. The resin is then air dried and subsequently heated or fired at about 1300° F. so as to decompose the resin and deposit an adherent layer or film of the metal (preferably gold or platinum) from the resin which carried it. The other component of the compound and the biners are volatilized by the heat.

The thus prepared substrate is next cleaned as a preliminary to evaporative deposition of the strain sensitive film 2, under evacuation conditions. While any of various cleaning methods may be used, it has been found satisfactory to wash the substrate with a heated detergent and water solution, thereafter rinse in water, and finally immerse it in hot iso-propyl alcohol vapor for about 10 minutes. When removed from the vapor, the substrate is clean and dry.

Figure 3:
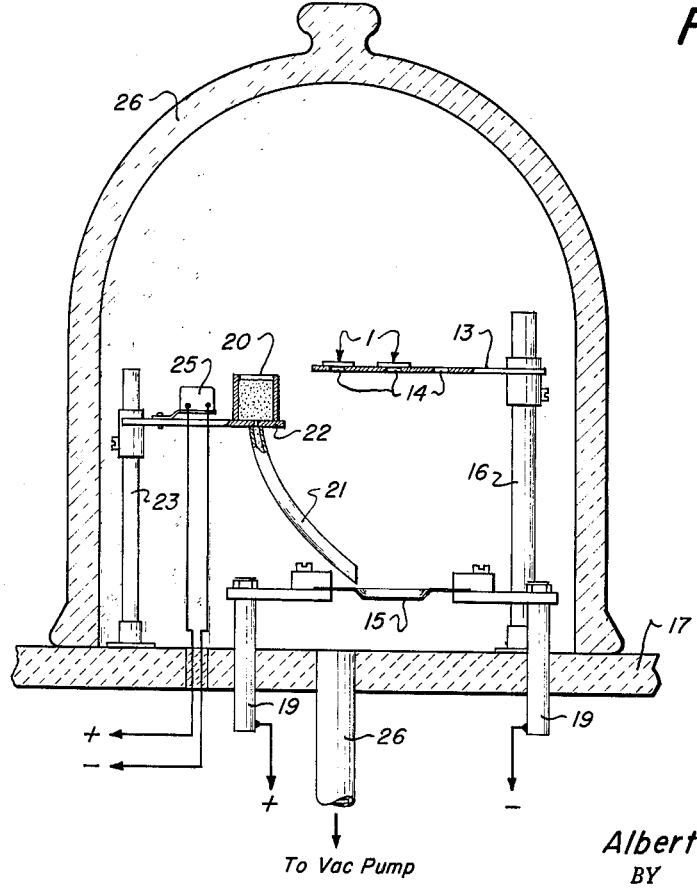
FIG. 3 is a schematic sectional view illustrating the manufacture of the present strain gauge.

The substrate is now ready to receive the strain sensitive film 2. One or more of the substrates are supported (FIG. 3) on a suitable mask 13 so as to overlie openings 14 therethrough. The sizes and shapes of the openings 14 are such as to form a film 2 of desired size and configuration. As shown, the mask and the substrates which it supports are held above a heat source or evaporation boat 15 by a support rod 16 which is in turn secured to a base plate or table 17.

The evaporation boat is held in position in any suitable manner and is electrically connected with terminals 19 that lead to a high current transformer or the like (not shown), whereby the evaporation boat may be maintained in heated condition (preferably about 1500° C.) by passing electric current through it, so that materials placed on the evaporation boat 15 may be evaporated therefrom and condensed upon exposed surfaces of the adjacent substrates 1.

Materials to be evaporatively deposited on the substrate 1 are supported adjacent the heat source, in powder form, in a hopper 20 which has a bottom or outlet orifice of such size that the powder does not normally flow through it but does flow therethrough when the hopper and contents are vibrated or agitated. When agitated, the powder mixture is released or falls through the hopper orifice into a delivery tube 21, from whence it is discharged onto the heat source or evaporation boat 15. The hopper may be carried adjacent one end of an arm 22, which is mounted adjacent its other end on a support column 23. Any suitable agitating means, for example, an electrical buzzer 25, may be carried by or secured to the arm 22 for vibrating it and agitating the hopper to effect flow of powder therefrom into the delivery tube 21.

A bell jar or cover 26 rests upon the base plate 17 and encloses the described combination, so that the interior of the bell jar may be evacuated via a conduit 26 which leads to a vacuum pump (not shown).

In manufacturing operations the chamber within the bell jar 26 is preferably evacuated to a pressure of about $10^{-4}$ to $10^{-5}$ millimeters of mercury or less, and the heat source or evaporation boat 15 is brought to a temperature of about 1500° C. by passing electric current therethrough. The hopper 20 is then vibrated or agitated to release the powder mixture which comprises the powders of iron, aluminum, and titanium in the desired proportions. The powder mixture, falling onto the evaporation boat 15 from delivery tube 21, evaporates almost instantly upon contacting the boat and, the vapors of the metals mixing in transit, condenses on the exposed area of the substrate 1 as an alloy film, overlying and electrically contacting the electrically conducting film contacts 8.

The alloy film thus obtained has been found highly satisfactory in high temperature applications when produced from powder mixtures with the composition range of 25–30 atomic percent iron, 35–50 atomic percent aluminum, and 20 to 40 atomic percent titanium. The particular alloy within this range which has the optimum ability to resist oxidation at high temperatures contains 27.3 atomic percent iron, 45.5 atomic percent aluminum, and 27.2 atomic percent titanium. Alloys of these components having the composition varied within the specified composition range also have suitable characteristics for the present purpose. It has been found, however, that iron-aluminum-titanium alloys having one or more of the alloy constituents outside of the specified composition range are unsuitable for the present purpose since the oxidation resistance falls off rapidly. For example, an alloy containing 10 atomic percent iron, 57.6 atomic percent aluminum, and 32.4 atomic percent titanium oxidized almost completely within a 15-minute period when heated in air at 400° C., this oxidation evidenced by marked changes in appearance and a great decrease in electrical conductivity. The same result was experienced with films of the elemental metals iron, aluminum, or titanium. In contrast, alloy films within the specified composition range have been found to resist oxidation under the same conditions even after several hundred hours exposure; little change occurs in either appearance or electrical conductivity of these alloy films. The following table gives the composition of some typical alloys within the specified range which will perform satisfactorily under the above conditions.

| Alloy No. | Composition (atomic percent) |
|---|---|
| 1 | 27.5 Fe—49 Al—23.6 Ti |
| 2 | 25 Fe—50 Al—25 Ti |
| 3 | 26 Fe—36 AL—38 Ti |
| 4 | 25.4 Fe—35.6 Al—39 Ti |
| 5 | 28.8 Fe—40 Al—31.2 Ti |
| 6 | 29 Fe—40 Al—31 Ti |

Thus, an important characteristic of the new non-aluminum-titanium alloys of this invention is their ability to withstand oxidation under high temperature conditions for a prolonged period, far exceeding that of other known alloys of these meals or of the elemental metals iron, aluminum, or titanium.

While the alloy film remains oxidation resistant up to temperatures as high as 400° C., above that temperature there is a tendency for the film to oxidize. However, even this upper temperature may be extended several hundred degrees by coating the film with a protective coating of silicon monoxide. The silicon monoxide may be evaporatively deposited subsequent to the previously described evaporative deposition of the alloy film without interrupting the existing vacuum condition in the chamber of the bell jar. Other characteristics of the alloy film add to its desirability for use in a resistance element. It is hard and has excellent adhesion to the ceramic layer 5. It has also been formed on glass, enamels, metals, etc., and in so far as can be ascertained, may be removed only by abrasive grinding or chemical attack. This hardness and adhesion, which has been found obtainable on substrates with varying degrees of cleanliness, contrasts markedly with the rather soft and weakly adhering films obtained from each of the elemental metals iron, aluminum, or titanium, even on carefully cleaned substrates.

An important advantage of the described method for producing the strain gauge is that it facilitates use with such metals or alloys as can not be readily drawn or rolled to small diameters or thicknesses. No preliminary wire or foil is necessary as the various powders desired may be placed in the hopper 20 and agitated and delivered to the heat source 15 for immediate evaporation and deposition on a desired substrate.

It will then be seen that the present invention provides a novel method of making a strain gauge; the method is relatively simple in operation and may be performed with inexpensive and readily available equipment. The resulting strain gauge may be used at high temperatures, up to about 400° C., in air without any protective coating on the strain sensitive alloy film and even higher with the protective silicon monoxide coating applied to the film. The gauge may be bent around articles of small radius and the substrate portion of the gauge may be cut as desired, without cracking or chipping, in order to fit the gauge into particular applications. The wire leads are embedded in the gauge so as to be integral with the elastic and non-conducting substrate.

The aforementioned oxidation and abrasion resistance of the alloy film makes it also useful as a high temperature resistor and potentiometer surface when it is deposited on a rigid, non-conducting backing. The non-conducting backing may be of ceramic, glass, or other high temperature material. For example, glass and ceramic plates such as Corning Fotoceram (commercially available from Corning Glass Corporation, Corning, New York) have been successfully used as backing members. Electrical leads and film contacts are then applied to these backings in the same manner as previously described for the strain gauge. In certain resistor applications, the alloy film may be overcoated with the protective film of silicon monoxide to increase its high temperature oxidation resistance so that the maximum temperature at which the alloy may remain useful is several hundred degrees higher than the maximum temperature attainable without the protective overcoating, i.e., 400° C. As previously mentioned, the shape of the film may be varied appropriate to its employment.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. An alloy for use as a heat generating electric current conducting element and as a protective coating subjected to heat consisting essentially of 25 to 30 atomic percent iron, 35 to 50 atomic percent aluminum, and 20 to 40 atomic percent titanium, characterized by resistance to oxidation on exposure to air and subjection to concurrent temperatures up to about 400° C.

2. An alloy for use as a heat generating electric current conducting element and as a protective coating subjected to heat consisting essentially of 27.3 atomic percent iron, 45.5 atomic percent aluminum, and 27.2 atomic percent titanium characterized by resistance to oxidation and concomitant minimization of electrical conductivity change on exposure to air and subjection to concurrent temperatures up to about 400° C.

3. A strain gauge comprising the combination of a strain sensitive film, an electrical insulating substrate supporting said strain sensitive film with said substrate comprising a thin metal foil carrying and substantially surrounded by a ceramic coating, and leads embedded in the ceramic coating at spaced locations electrically connected to said strain sensitive film.

4. The strain gauge as claimed in claim 3, wherein said strain sensitive film is a metal alloy consisting essentially of 25 to 30 atomic percent iron, 35 to 50 atomic percent aluminum, and 20 to 40 atomic percent titanium, characterized by resistance to oxidation on exposure to air and subjection to concurrent temperatures up to about 400° C.

5. The strain gauge as claimed in claim 3, wherein said strain sensitive film is a metal alloy consisting essentially of 27.3 atomic percent iron, 45.5 atomic percent aluminum, and 27.2 atomic percent titanium, characterized by resistance to oxidation and concomitant minimization of electrical conductivity change on exposure to air and subjection to concurrent temperature up to about 400° C.

6. The strain gauge as claimed in claim 3, wherein each of the leads is electrically connected with the strain sensitive film by an intermediate electrically conducting film contact carried by the coating and overlying an embedded lead portion.

7. The strain gauge claimed in claim 3 wherein the thin metal foil has a pair of oppositely disposed generally flat sides each provided with a layer of said ceramic coating, and the thickness of each said ceramic layer is substantially equal to the thickness of the thin metal foil.

8. The strain gauge claimed in claim 7 wherein the combined thickness of the thin metal foil and the ceramic layers is about .003 inch enabling the resulting substrate to readily conform to a curved surface.

References Cited by the Examiner
UNITED STATES PATENTS

| | | | |
|---|---|---|---|
| 2,464,836 | 3/49 | Thomas et al. | 75—124 X |
| 2,548,592 | 4/51 | De Michele. | |
| 2,739,212 | 3/56 | Woolley et al. | |
| 2,926,325 | 2/60 | Moore et al. | 338—308 |
| 2,927,048 | 3/60 | Pritikin | 338—308 |
| 2,934,736 | 4/60 | Davis | 338—308 |
| 2,939,807 | 6/60 | Needham | 338—308 |
| 3,008,109 | 11/61 | Starr | 338—2 |
| 3,056,937 | 10/62 | Pritikin | 338—308 |
| 3,067,310 | 12/62 | Walz et al. | 338—308 X |

RICHARD M. WOOD, *Primary Examiner.*

M. O. LYONS, *Examiner.*